United States Patent Office 3,458,174
Patented July 29, 1969

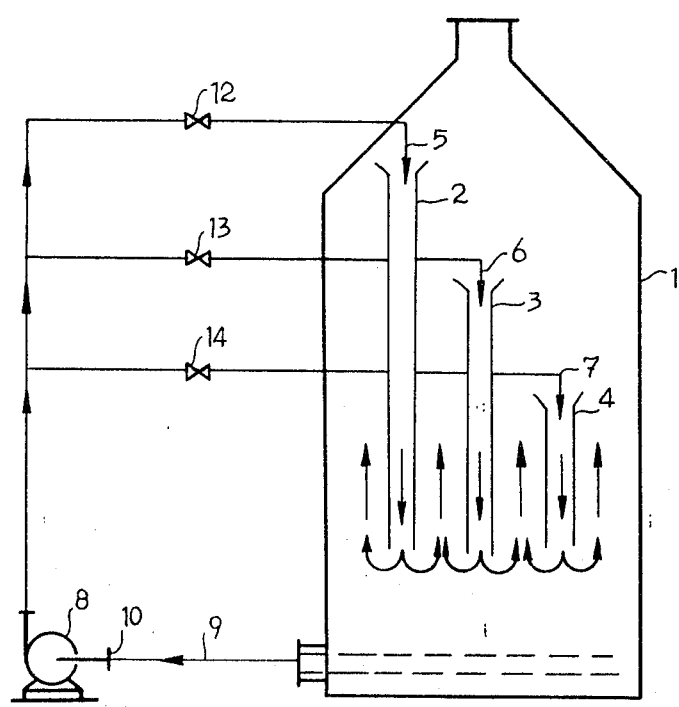

---

3,458,174
MIXING THERMOPLASTIC MATERIALS
Raffaele Gaspari, Milan, Italy, assignor to Società
Italiana Resine S.p.A., Milan, Italy
Continuation of application Ser. No. 563,813, July 8,
1966. This application Aug. 20, 1968, Ser. No. 755,506
Claims priority, application Italy, July 8, 1965,
15,232/65
Int. Cl. B01f *15/00, 5/12*
U.S. Cl. 259—4     1 Claim

ABSTRACT OF THE DISCLOSURE

A method and apparatus for blending granular synthetic resin products in which the resin products are carried in a container by a fluid. A plurality of injector columns are arranged within the container to direct the liquid carrier and resin products in a vertical direction opposite to that in which the resin products would normally flow due to gravitational force.

---

This application is a continuation of my prior copending application Ser. No. 563,813, filed July 8, 1966, now abandoned.

This invention relates to a method of homogenising granulated thermoplastic materials, particularly polyethylene.

The problem frequently arises in industry of homogenising various batches of granulated plastics. This problem is due to the existence of slight differences in certain characteristics of each batch. These characteristics are particularly optical characteristics, such as colour and transparency due to unavoidable fluctuations of the manufacturing plant even if it operates a continuous process.

An attempt has been made to solve this problem in the past by introducing the batches differing in technological characteristics into separate containers which are provided with an outlet controlled by a rotary valve. Thus each batch can be discharged at a common point thereby achieving a certain degree of homogeneity.

Obviously this method is objectionable for a variety of reasons, such as the considerable power consumption in operating the various rotary valves, wastage due to unavoidable deformations of the granules which are ground in the valves and expenditure on the number of containers used.

It has now been found that a thorough homogenisation of granules of plastics can be effected by utilising an extremely simple apparatus comprising a plurality of homogenising devices or ejectors in a single container and using a fluid which is inert towards the material to be homogenised.

According to the invention we provide a method of homogenising granules of a thermoplastic material comprising circulating inert fluid by a pump through a device comprising at least two homogenising devices arranged at different levels within a single container, adding granules to be homogenised to the fluid so that they may pass through the homogenising devices with it and withdrawing granules after homogenisation.

In preferred embodiments of the invention water or air is used as the inert fluid. The invention is of particular importance in the homogenisation of polyethylene.

An embodiment of the invention will now be described with reference to the accompanying drawing in which:

The figure shown is a diagrammatic sketch of one arrangement according to the invention.

The apparatus comprises a single container 1 to which granules manufacttured by a continuously operated plant or the various batches to be homogenised are conveyed by means of inert homogenising fluid. A number of ejectors 2, 3, 4 are installed in the container 1 and may consist simply of funnels having their intake turned towards the circulating fluid inlet which may be subdivided into a number of fluid inlets 5, 6, 7, corresponding with the number of ejectors provided. The ejectors 2, 3, 4 have their intakes arranged at different levels with respect to the container in sectional view. The number of ejectors is at least two and is related to the capacity of the container.

The container 1 is connected to a centrifugal pump 8 through a pipe 9 provided with a filter 10 to prevent the entry of granules into the pump, this arrangement causing the return of the fluid to the container inlet, thereby operating the ejectors. Recirculating fluid is recharged with granules to be homogenised at granule inlets 12, 13 and 14. Homogenised granules can be removed at any convenient point before the filter.

The direction of the fluid circulation is selected so as to be opposite to the direction which would be taken by the graunles immersed in the fluid under the action of natural forces only. Where a plastic material is homogenised which is of lower density than the inert homogenising fluid the granules will tend to rise upwardly. Thus when water is used the circulation will be effected in a downward direction and when using air with the same material, circulation will be effected in an upward direction. Thus the material is caused to flow through the ejector and issues from the end thereof under the resultant force of gravity and the archimedian thrust (force of circulation) towards the ejector mouth.

The ejectors are so arranged that the circulating fluid will move towards a point common to two of them at least. Since the mouths of the ejectors are arranged at various location within the container the material issuing from any of the ejectors tends to be steadily conveyed under natural forces to a point in the container at which the circulatory forces take over again and force the granules towards the ejector mouths which are at different locations and thence through an ejector again. The tendency is for material to pass through an ejector at a lower level each time. This results in a gradual homogenising of the granules which are transferred from one ejector to another. Obviously a few recirculating cycles of the material through this device are sufficient for reaching a thorough homogenity.

The advantages of this method of homogenising thermoplastic materials with respect to conventional methods is quite obvious and consist in the provision of only one rotary machine (centrifugal pump), a reduced power consumption and, above all, avoidance of waste due to crushing or deformation of the granules. In this method the product is steadily delicately moved by the conveying fluid and never comes into contact with moving mechanical parts. A last advantage is due to the fact that a single container is required which results in lower expense, maintenance and cleaning with respect to conventional multi-container arrangements.

I claim:

1. A method of homogenising granules of synthetic resin material in a container, the method comprising; utilizing a liquid carrier inert with respect to the synthetic resin material and of a density greater than the synthetic resin material so that the granules are buoyant within the carrier liquid, forcing the carrier liquid downwardly through a plurality of ejectors in the container containing synthetic resin granules to be homogenised, sucking the synthetic resin granules from the container into the inlets of the ejectors at different levels within the container, discharging the carrier liquid and granules sucked into the ejectors from the ejectors within the container so that the granules are buoyant within the carrier liquid in the container, recirculating the carrier liquid through the ejectors, a portion of the recirculating flow being outside the container, filtering the liquid carrier during recirculation, adding granules to be homogenised to the liquid carrier during recirculation, and withdrawing homogenised granules from the carrier.

References Cited

UNITED STATES PATENTS 2,577,797   12/1951   Moyer.
2,635,859   4/1953    Dreyfus.
3,276,753   10/1966   Solt et al.

FOREIGN PATENTS 539,141   11/1931   Germany

WALTER A. SCHEEL, Primary Examiner
J. M. BELL, Assistant Examiner

U.S. Cl. X.R.

259—95